(No Model.) 2 Sheets—Sheet 1.
N. POTSCHINSKY.
AUTOMATIC BATHOMETER AND SHOAL WATER INDICATOR.
No. 507,590. Patented Oct. 31, 1893.
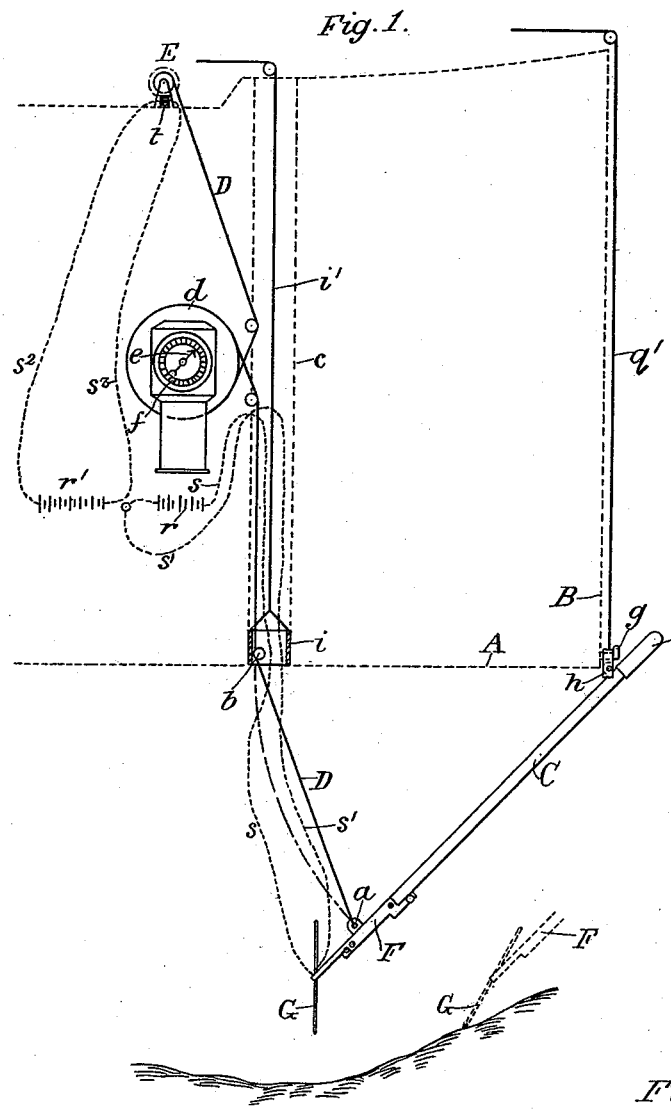
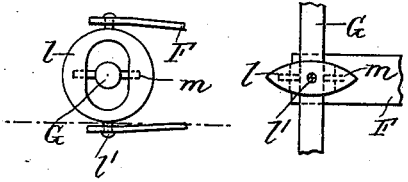
Witnesses:
J. R. Bolton
E. K. Sturtevant
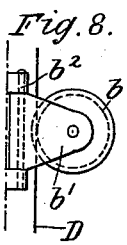
Inventor:
Nicolaus Potschinsky
By his Attorneys.

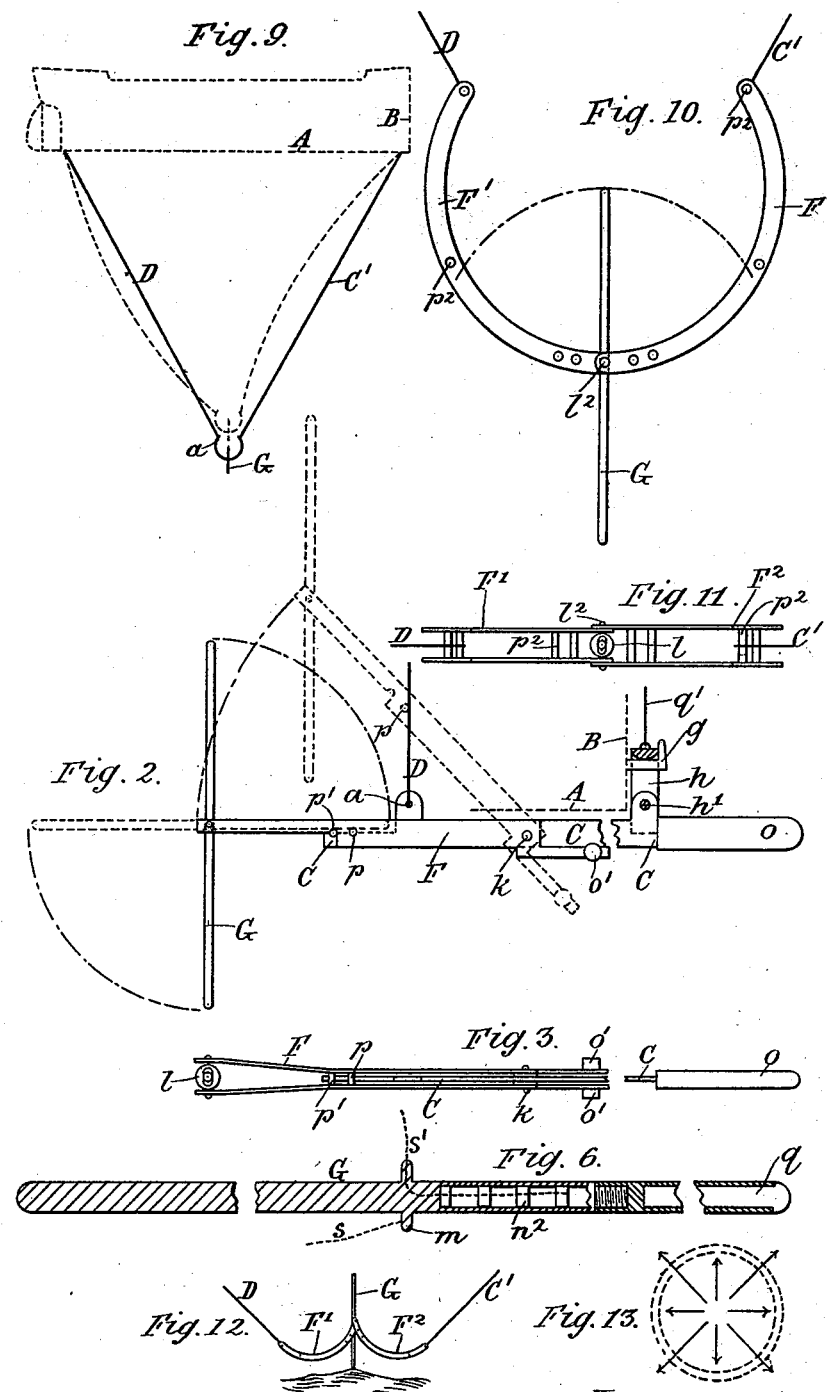

UNITED STATES PATENT OFFICE.

NICOLAUS POTSCHINSKY, OF ODESSA, RUSSIA.

AUTOMATIC BATHOMETER AND SHOAL-WATER INDICATOR.

SPECIFICATION forming part of Letters Patent No. 507,590, dated October 31, 1893.

Application filed December 27, 1892. Serial No. 456,346. (No model.)

*To all whom it may concern:*

Be it known that I, NICOLAUS POTSCHINSKY, colonel of engineers, a subject of the Emperor of Russia, and a resident of Odessa, in the Empire of Russia, at present residing at De Keyser's Royal Hotel, London, England, have invented a certain new or improved method of and means for automatically taking and indicating soundings for purposes of navigation, applicable also for taking and indicating soundings for hydrographical, topographical, geological, and like purposes, of which the following is a specification.

This invention relates to a new or improved method of and means for taking and indicating soundings for purposes of navigation and is also applicable for taking and indicating soundings for hydrographical, topographical, geological and like purposes; its chief object is to automatically measure and indicate for preservative purposes the exact depth of water (within certain pre-determined limits) immediately beneath a vessel, even when the same is moving at full speed.

The invention is based, as will hereinafter appear, upon the theory of suspending a point beneath the keel of a vessel by a triangular system or arrangement, two sides of the triangle being of constant length and composed by the keel and one of the integral parts of the apparatus while the third side of the triangle which is composed by another integral part of the apparatus is of variable length.

I prefer to designate my invention "the automatic pilot."

In taking soundings for purposes of navigation; it is almost impossible to ascertain the exact depth of water immediately beneath a vessel moving at any rate of speed by means of the ordinary sounding apparatus, such as a "lead-line" and "lead" since by the time the "lead" reaches the bottom the vessel has usually passed the point of contact, but by the employment of my invention the exact depth of water (within certain pre-determined limits, immediately beneath the vessel's keel will be automatically measured and indicated even when the vessel is moving at its highest speed.

My invention may be embodied in various forms of apparatus, provided the apparatus is so constructed and arranged as to embrace or comply with the following principle or conditions, that is to say, in one of the integral parts of the apparatus there must be a point situated at a pre-determined distance below the keel and suspended in position by a triangular system or arrangement as hereinbefore mentioned and the position of this point relatively to the keel must remain constant and unaltered so long as the depth of water beneath the vessel exceeds to any extent the said predetermined distance of the point from the keel, but the moment the depth of water beneath the vessel approaches or becomes less than the said pre-determined distance, the said point, without touching the bottom of the sea, must be caused automatically to ascend through a curve which maintains a constant or unaltered position relatively to the vessel, and must continue to ascend through said curve so long as the depth continues to lessen, descending again as the depth increases thus following all the variations in depth (within the limits fixed by the pre-determined depth of the point) beneath the keel of the vessel in its course. The said point must also be connected with apparatus or means which will cause the amount of its upward or downward movement and consequently the variation in the depth of water beneath the vessel, to be automatically indicated.

I will now proceed to describe having reference to the accompanying drawings in which similar letters refer to corresponding parts in all the figures two arrangements of apparatus embodying the principle of my invention as above set forth, the one being for taking and indicating soundings at a moderate depth for purposes of navigation and the other being for taking and indicating soundings at a greater depth (not exceeding the length of the vessel) for hydrographical, explorative and like purposes.

Figure 1 is a side elevation, partly diagrammatic, which illustrates the application to vessels of apparatus constructed in accordance with my invention for taking and indicating soundings at moderate depths for purposes of navigation. Figs. 2 and 3 are detached views showing on a larger scale the bar and swinging frame in side elevation and plan respectively. Figs. 4 and 5 are detached views showing on a larger scale in plan and part sectional side elevation respectively the method of suspending the "feather" in the swinging frame. Fig. 6 is a detached view on a larger scale showing the "feather" in longitudinal section the electrical contact makers being omitted. Fig. 7 is a longitudinal section of a portion of the "feather" on an enlarged scale showing the arrangement of the electric contact makers. Fig. 8 is a side elevation of the pulley over which the rope D passes. Fig. 9 is a diagrammatic view illustrating in side elevation a modified form of apparatus constructed according to my invention for taking and indicating soundings at a greater depth for hydrographical, explorative and like purposes. Figs. 10 and 11 are detached views, on a larger scale showing in side elevation and plan respectively the means employed in the said modified form of apparatus for suspending the "feather." Fig. 12 shows the device illustrated in Figs. 10 and 11 in the position it assumes when the "feather" is brought into violent contact with the ground when in a vertical position. Fig. 13 is a diagram illustrative of the various directions in which the electrical contact makers within the "feather" may be arranged to tip and make contact when four electrical contacts are employed.

Referring to Figs. 1 to 8 A represents the keel of a vessel and B the stem or cutwater.

C is an arm or bar hinged at one end to the forepart of the keel and having its other end connected at the point $a$ with a wire rope D. The keel A, arm C, and wire rope D, constitute the triangular system or arrangement before referred to, D being the side of variable length, and the suspended point would be situated at or near $a$. The length of the arm or bar C will depend upon the limit of depth pre-determined for the point $a$, say for example thirty-five feet below the keel. The wire rope D passes up into the interior of the vessel over a pulley $b$ through a tube $c$, and its end is secured to the drum of a windlass or winding apparatus E automatically operated in any convenient manner, as by steam or electricity, or, in the case of small vessels where the apparatus is light, it may be operated by a weight or springs. Before the rope D reaches the windlass it passes around the drum or pulley $d$ the axis of which carries a pointer or index $e$ which moves around the face of a graduated dial $f$. In order to maintain the bar C and rope D in a vertical plane when the ship rolls, I prefer to hinge or pivot the bar C to the vessel in the following manner:—$g$ is a hook or bolt fixed in the stem of the vessel. $h$ is a shackle or ⌐ shaped frame suspended by the bolt $g$ which bolt is of round section where embraced by the shackle. The bar C is clasped on either side by the arms of shackle $h$ and pivots between them on the pin $h'$. The bar C will consequently always lie within a vertical plane notwithstanding rolling of the vessel, and in order to preserve the proper relative positions of the pulley $b$ and wire rope D when the ship keels over, I mount the said pulley in a frame $b'$ which is free to swing or swivel on a vertical axis $b^2$. I prefer also to secure the said pulley frame to the interior of a tubular chamber $i$ free to slide within the tube $c$ without rotating therein. This permits the tubular chamber $i$ and contained pulley $b$ to be drawn up the tube $c$ by a suitable rope $i'$, when required, as for fitting purposes.

F is a light steel frame pivoted to the arm C at $k$ and forming a prolongation thereof. Between the arms of the frame F at the free end thereof is mounted on pivots $l'$ the ring $l$.

G is a steel cylinder which I term a "feather" and $m$ are trunnions situated exactly in the center of its length, which trunnions are mounted in the ring $l$ at right angles to the pivots $l'$ thereof. My object in thus mounting the "feather" G is to permit the same to swing or oscillate in every direction. When the depth of water beneath the vessel exceeds the pre-determined depth at which the point $a$ is set and the "feather" G is consequently out of contact with the ground the "feather" G will by its construction and arrangement as hereinafter described remain in a vertical position, but when the depth of water lessens and approaches the pre-determined depth of the point $a$, and the ground consequently comes into contact with the lower end of the "feather" G, the forward movement of the vessel will cause the "feather" G to leave its vertical position and assume an inclined position as shown in the dotted lines in Fig. 1. Within the "feather" G are disposed electrical contact makers $n$ so arranged and constructed as to tip over and make contact with the sides of the "feather" G and thereby complete through suitable conductors an electric circuit or circuits when the "feather" G leaves its normal vertical position. The general arrangement of the contacts and circuits will be hereinafter described. The effect of completing the circuit is to start in any suitable manner the automatic winding machinery of the windlass E, which will, by means of the wire rope D, draw up and raise the arm C, and at the same time the wire rope D will cause the index $e$ to move in corresponding proportion, thus indicating on the graduated dial the length of the arc described by the point $a$, and since the depth at which such point $a$ was originally set is known it is obvious that the dial $f$ may be readily so graduated as to indicate in feet and inches or other suitable denominations the exact depth of water beneath the vessel's keel, within the limit at which the apparatus commences to act, such limit being of course the pre-determined depth at which the suspended point $a$ was set, plus the length of the "feather" G below the level of such point. The moment however the feather G leaves the ground, and consequently re-assumes its vertical position, the circuit is broken thereby causing the stoppage of the winding machinery of the windlass E, which should be so constructed as to permit the apparatus to descend slowly again by its own weight until it again reaches the pre-determined depth, or until it again touches the ground. An electric bell should be arranged in the circuit so as to call attention to the dial $f$ every time the apparatus acts by reason of alterations in the depth within the pre-determined limits.

As when the vessel is moving the action of the water would tend to raise the bar C, the same should be constructed of such transverse section as to cut through the water easily. A preferable section would be that of a broad double edge sword. The pressure of the water when the vessel is moving would also tend to raise the arm C by curving or bowing out the wire rope D (which should be of as small diameter as possible so as to lessen its resistance to the water). Consequently I provide the arm C with a pressure counteracting prolongation $o$, preferably formed of wood, which extends beyond the pivot $h'$ and which by offering greater resistance to the water than the blade like arm C will counteract any tendency of the said arm to rise.

The main object of the swinging frame F is to prevent injury to the "feather" G should the same be brought violently into contact with the ground when in a vertical position, as by plunges of the ship for example. Should this occur the light frame F will rise on its pivots $k$ thereby taking off the violence of the shock.

$p$ is a pin or bolt connecting the sides of the frame F, which, when the frame is violently thrown up by a sudden shock as above mentioned, will come into contact with the rope D (as shown in Fig. 2) which acts as an elastic buffer and serves to restore the frame F to its normal position.

$p'$ is a pin or bolt secured transversely across the arm C, upon which bolt the frame F is supported.

$O'$ are wooden disks constituting pressure counteracters secured to the frame F for the same purpose as the pressure counteracter $o$ on the bar C before described. They resist the tendency of the water to lift the swinging frame F when the vessel is in motion.

The method of mounting the "feather" G has already been described and will be clearly seen on referring to Figs. 4 and 5. It should however be mentioned that the periphery of the ring $l$ should be sharpened as shown clearly in Fig. 5 so as to cut through the water readily. As before mentioned the "feather" G in its normal position when out of contact with the ground must always be vertical even when the vessel is in motion, and I insure this, first, by making the upper portion of the "feather" above the trunnions $m$ in the form of a tube filled with wood or light material $q$ thereby rendering the lower portion below the trunnions $m$ heavier, and, secondly, by making both the said upper and lower portions of the "feather" of exactly equal size, thereby equalizing the resistance of each said portion to the water when the vessel is in motion.

$n$, Fig. 7, represents an electrical contact maker within the "feather," which works on a pivot $n'$ secured to a base or partition of insulating material $n^2$. The said contact $n$, when the "feather" G leaves its vertical position, will tip over as shown in dotted lines and complete an electric circuit through the side of the "feather," one of the conductors or wires of the circuit being connected with the bolt $n^3$ and the other with the exterior of the "feather." The contact maker $n$ should be so arranged in relation to its pivot $n'$ as not to tip over and make contact until the "feather" reaches an angle of from thirty degrees to forty degrees from the perpendicular, otherwise a slight swaying of the "feather" from any accidental cause would complete the circuit and give false indications. It should also be so arranged upon its pivot as that when tipped over it will not return to its normal position and break contact by a mere slight swaying of the feather.

In Fig. 6 the "feather" is shown as provided with spaces for four contact makers, which are intended to tip in four different directions (see the diagram Fig. 13 where the short arrows indicate the directions in which the contact makers tip) and thus to make electrical contacts in whichever direction the "feather" is inclined, and this arrangement is sometimes necessary as will be hereinafter explained in apparatus for taking and indicating soundings for hydrographical, explorative and like purposes, but in the apparatus above described for taking and indicating soundings for purposes of navigation, only one contact maker, which completes an electrical circuit when the feather inclines in the direction shown in dotted lines in Fig. 1, will be found to be sufficient.

I will now describe a convenient arrangement of connections between the "feather" and any suitable apparatus for starting the windlass E.

$r$, Fig. 1, represents an electric battery or generator of small power, from one pole of which a thin wire $s$ passes down the tube $c$ and leads to the exterior of the "feather" G, while from the other pole a thin wire $s'$ leads to the bolt $n'$ to which the contact maker $n$ is pivoted.

$r'$ is a much stronger battery from which thicker wires $s^2$ $s^3$ complete a circuit with some suitable electrical mechanism $t$, such as powerful electric magnets, for causing the starting of the windlass when the circuit is completed. The second and stronger circuit is to be completed by the current of the weaker circuit in any well known manner, my object in having two separate circuits being to avoid the burning of the thin wires which lead to the "feather," which would probably happen were only one circuit employed in which the current was of sufficient strength to operate the windlass starting mechanism. The barrel of the windlass may be rotated from the motor employed through the intervention of any convenient clutch or like arrangement which will permit the weight of the suspended bar C to move the barrel in the reverse direction when the operating mechanism is stopped by the breaking of the circuits. A suitable brake would be provided to prevent the too rapid descent of the bar C. The driving mechanism of the windlass may be caused to operate when the circuit is completed, in any suitable manner, as by causing the current to start the motor, or, in the case of spring or weight operated windlasses, to release a locking device of some sort, such as a pawl engaging with a ratchet wheel. This and the arrangement of the circuits will of course be readily understood by those acquainted with the art.

$q'$ Figs. 1 and 2 represents a rope which may be secured to the shackle $h$ for use in placing the apparatus in position or raising the same. When the ground shoals so much as to cause the arm C to be drawn up close to the keel the "feather" is free to assume the position shown in dotted lines in Fig. 2.

I will now proceed to describe a modified form of apparatus, having reference to Figs. 9, 10, 11 and 12, for taking and indicating soundings at a greater depth for hydrographical, explorative, and like purposes. The only difference between this apparatus and that just described consists in the substitution of a wire rope $C'$ (which should be of small diameter so as to offer as little resistance as possible to the water) for the bar C. The said wire rope $C'$ is secured to the vessel at or near the junction of the stem and keel in any convenient manner. My object in substituting a wire rope for the bar C is to reduce the weight of the apparatus which would be excessive if the bar C were made three hundred or four hundred feet long. It would also be impracticable to construct an arm or bar of that length. The employment of the wire rope $C'$ in lieu of the bar C necessitates also a modification in the means employed for mounting the "feather," the said modified means consist of two curved frames $F'$, $F^2$ pivotally connected at $l^2$ by the pivots of the ring $l$ within which the trunnions $m$ of the "feather" G are mounted. The keel A, rope D, and wire rope $C'$, constitute the triangular system or arrangement, and the suspended point would be situated at or near the junction of the rope D and frame $F'$. Should the feather be brought violently into contact with the ground when in a vertical position, as by a heavy plunge of the vessel, the frames $F'$ $F^2$ will open outward and take up the shock assuming the position shown in Fig. 12.

The wire rope D is secured to the frame $F'$, and the wire rope $C'$, which takes the place of the arm C, to the frame $F^2$. $p^2$ are bolts connecting the sides of the frames $F'$ $F^2$ to which the ropes D and $C'$ may be secured. In this modified form of apparatus I prefer to employ four contact makers within the "feather," which will, as before explained, complete the circuit in whatever direction the "feather" is inclined, since all the contact makers are so arranged as to tip or cant in directions at right angles to one another. It will therefore be readily understood by any electrician, that by suitable indicators in the circuits of the various conductors the direction of inclination of the "feather" G may be indicated on the ship, and consequently the directions in which the sea bottom slopes. Should the "feather" G incline in a direction intermediate to the lines in which the contact makers tip (that is to say in the direction of the long arrows Fig. 13) two of the contact makers $n$ would complete simultaneous circuits, which could of course be easily indicated. Consequently every direction of inclination of the "feather" can be ascertained on the vessel, and the direction of slope of the sea bottom as well as the depth ascertained.

When the modified form of apparatus is employed, the pressure of the water on the long wire ropes D and $C'$ will, when the vessel is in motion, cause them to assume the curved form shown in dotted lines in the diagram Fig. 9, and consequently they will slightly raise the "feather," so that, presuming the "feather" G to have been set at a pre-determined depth of say four hundred feet, when the dial indicates four hundred feet the depth will in reality be rather less, but the amount will be too small to be of any importance. It is better however that the vessel should move at slow speed when using this form of apparatus.

In conclusion I would observe that I do not confine or limit myself to the precise details of construction hereinbefore described and illustrated in the drawings, as the same might obviously be varied without departing in any way from the principle of my invention as set forth.

What I claim, and desire to secure by Letters Patent of the United States, is—

1. In combination, the feather pivotally supported and having the movable contact therein, the connection between the said feather and the stem of the vessel, the rope or wire D, the winding apparatus connected thereto and the electric circuits including the contacts of the feather and the winding apparatus, substantially as described.

2. In combination, the feather having the contact piece, the ring $l$ to which said feather is pivoted, the connection between the ring and the vessel to which said ring is pivoted the rope D extending to the vessel, the electric circuit to be closed by the contact carried by the feather, and the device actuated through the closing of said circuit substantially as described.

3. In combination, the feather having the contact piece, the means for supporting the same including the pivoted frame with the connection therefrom to the vessel the rope D extending from said support to the vessel, the electric circuit to be closed by the contact carried by the feather, and the device actuated through the closing of said circuit substantially as described.

4. In combination, the feather, the series of contacts therein adapted to move independently in different radial directions, the connection between said feather and the vessel to which the feather is pivoted, the rope D the electric circuits, and the device actuated through the closing of said circuits substantially as described.

5. Apparatus for taking and indicating soundings comprising in combination an arm or bar hinged at one end to the vessel at or near the junction of the keel and stem thereof, a rope connecting the free end of the said arm or bar with an automatically operated windlass on the vessel, a swinging frame pivoted to the said free end of the arm or bar, a cylinder or "feather" so mounted at the free end of the swinging frame as normally to maintain a vertical position while free to be deflected or inclined from such vertical position by contact with the ground, an electrical contact maker disposed within the "feather" so constructed and arranged as to complete an electric circuit or circuits which starts the motor of the windlass when the feather assumes an inclined position, and an indicator on the vessel so connected with the rope which raises the arm or bar as to indicate the amount of movement of such rope in raising or lowering the bar, substantially as and for the purposes described and illustrated.

6. In combination, the feather, the supporting connection therefor to which said feather is pivoted, the movable contact in the feather, the rope D extending from the feather support to the vessel, the winding apparatus and the indicating mechanism in contact with the rope D and the electrical circuits including the feather and the winding apparatus, substantially as described.

7. In combination, the feather having the contact piece, the arm C to which the feather is connected, said arm being pivoted to the vessel, the prolongation O connected to the arm C above the pivot thereof the rope D extending from the arm to the vessel, the electric circuit to be closed by the contact carried by the feather, and the device actuated through the closing of said circuit, substantially as described.

8. In combination, the tilting feather, the connection therefrom to the vessel, the contact in the feather and the electrical circuit extending the feather to the vessel, substantially as described.

9. In apparatus for taking and indicating soundings, the combination of the arm C, swinging frame F "feather" G and rope D constructed and arranged substantially as and for the purposes described and illustrated.

In testimony whereof I have signed my name to this specification, in the presence of two subscribing witnesses, this 28th day of November, A. D. 1892.

NICOLAUS POTSCHINSKY.

Witnesses:
A. E. ALEXANDER,
*Chartered Patent Agent,* 19 *Southampton Buildings, London, W. C.*
J. BURGESS,
*Clerk to above,* 19 *Southampton Buildings, London, W. C.*